(12) United States Patent
Yanovsky et al.

(10) Patent No.: US 9,275,047 B1
(45) Date of Patent: Mar. 1, 2016

(54) METHOD AND APPARATUS FOR MULTIMEDIA CONTENT FILTERING

(75) Inventors: Roman Yanovsky, Los Altos, CA (US); Igor Korsunsky, Sunnyvale, CA (US); John Gmuender, San Jose, CA (US); Boris Yanovsky, Saratoga, CA (US)

(73) Assignee: DELL SOFTWARE INC., Round Rock, TX (US)

( * ) Notice: Subject to any disclaimer, the term of this patent is extended or adjusted under 35 U.S.C. 154(b) by 296 days.

(21) Appl. No.: 11/236,280

(22) Filed: Sep. 26, 2005

(51) Int. Cl.
*G06F 17/30* (2006.01)

(52) U.S. Cl.
CPC .......... *G06F 17/30* (2013.01); *G06F 17/30056* (2013.01)

(58) Field of Classification Search
None
See application file for complete search history.

(56) References Cited

U.S. PATENT DOCUMENTS

| | | | | |
|---|---|---|---|---|
| 6,119,167 | A * | 9/2000 | Boyle et al. | 709/234 |
| 7,165,175 | B1 * | 1/2007 | Kollmyer et al. | 713/154 |
| 7,231,381 | B2 * | 6/2007 | Li et al. | 707/3 |
| 7,437,772 | B1 * | 10/2008 | Thenthiruperai et al. | 726/30 |
| 2002/0138839 | A1 * | 9/2002 | Nihal | 725/60 |
| 2004/0006767 | A1 * | 1/2004 | Robson et al. | 725/28 |
| 2004/0111465 | A1 * | 6/2004 | Chuang et al. | 709/203 |
| 2004/0220926 | A1 * | 11/2004 | Lamkin et al. | 707/3 |
| 2005/0166234 | A1 * | 7/2005 | Jarman | 725/46 |
| 2005/0268317 | A1 * | 12/2005 | Cormack et al. | 725/25 |
| 2006/0031870 | A1 * | 2/2006 | Jarman et al. | 725/25 |
| 2006/0095410 | A1 * | 5/2006 | Ostrover et al. | 707/3 |
| 2006/0101487 | A1 * | 5/2006 | Jarman et al. | 725/34 |
| 2007/0055700 | A1 * | 3/2007 | Yang et al. | 707/104.1 |
| 2007/0061835 | A1 * | 3/2007 | Klein et al. | 725/25 |
| 2007/0174471 | A1 * | 7/2007 | Van Rossum | 709/229 |
| 2007/0214473 | A1 * | 9/2007 | Barton et al. | 725/28 |
| 2007/0233701 | A1 * | 10/2007 | Sherwood et al. | 707/10 |
| 2010/0131104 | A1 * | 5/2010 | Brown | G05B 19/4185 700/275 |

* cited by examiner

*Primary Examiner* — Rehana Perveen
*Assistant Examiner* — Raheem Hoffler
(74) *Attorney, Agent, or Firm* — Lewis Roca Rothgerber Christie LLP

(57) ABSTRACT

Method and apparatus for multimedia content filtering are described herein. In one embodiment, an example of a network access device, in response to multimedia content transmitted from a source over a first network and destined to a destination over a second network, opens the multimedia content within the network access device interfacing the first and second networks. A content rating operation is performed on the opened multimedia content to determine whether the multimedia content should be transmitted to the destination over the second network. Other methods and apparatuses are also described.

21 Claims, 5 Drawing Sheets

100

METHOD AND APPARATUS FOR MULTIMEDIA CONTENT FILTERING

FIELD OF THE INVENTION

The present invention relates generally to content filtering. More particularly, this invention relates to multimedia content filtering.

BACKGROUND

Today, various content filtering mechanisms are provided to entities to manage and/or control user access to the Internet via facilities provided by the entities. For example, a company typically implements some forms of content filtering mechanisms to control the use of the company's computers and/or servers to access the Internet. Access to content within certain predetermined categories using the company's computers and/or servers may not be allowed during some predetermined periods of time.

For example, a typical content filtering client, which typically resides within a firewall, sends a request for the content rating of a web page in response to each web page browsed. The content rating requests are routed to a separate content rating server. When the content rating server receives a request, the content rating server retrieves the content rating for that request from a database and sends the content rating to the content filtering client. Based on the content rating retrieved, the content filtering client determines whether the user is allowed to access the web page. If the user is allowed, the content filtering client passes the web page. Otherwise, the content filtering client blocks the web page.

As the amount and type of multimedia content on the Web keep growing, the ability to access a large amount of multimedia content from the Web raises new questions on how to classify or rate such content, in order to provide content security. Although conventional content filtering techniques work well on text-based content, such techniques are not able or work poorly to perform content filtering on multimedia content, such as, for example, audio and/or video content.

SUMMARY OF THE DESCRIPTION

Method and apparatus for multimedia content filtering are described herein. In one embodiment, an example of a network access device, in response to multimedia content transmitted from a source over a first network and destined to a destination over a second network, opens the multimedia content within the network access device interfacing the first and second networks. A content rating operation is performed on the opened multimedia content to determine whether the multimedia content should be transmitted to the destination over the second network.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Method and apparatus for multimedia content filtering are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Accordingly, multimedia processing techniques are utilized to perform content filtering and/or content rating on multimedia content. For example, if network traffic going through a network appliance, such as a network access device or gateway, includes an audio stream, speech recognition provides a way to classify the audio stream that is being downloaded or played over a network (e.g., Internet). According to one embodiment, if the network traffic includes, for example, an audio stream detected by a network access device, the detected audio stream may be extracted from the network traffic by the network access device before the audio stream reaches a destination. The extracted audio stream may be fed to a speech recognition unit to classify or identify a pattern or patterns of the audio stream and a content rating is performed on the recognized audio stream. Thereafter, the network access device may decide whether the audio stream may be transmitted to the destination based on the content rating.

In one embodiment, the classification of the multimedia content may be performed based on a vocabulary or on detecting semantics in the multimedia content. The content categories may be used to allow or block user access to various types of content, which may be tailored around specific users, groups, IP subnets, time of day or week or other relevant policies that may apply.

Note that throughout this application, an audio stream is used as an example of multimedia content for the purposes of illustration. But it is not so limited; it will be appreciated that other types of multimedia content, such as, for example, images and/or video streams, may also be applied. Also note that throughout this application, a network access device (e.g., a gateway device) is used as an example to perform the techniques described herein for the purposes of illustration. But it is not so limited; it will be appreciated that other devices may also be used to perform the techniques described throughout this application.

Figure 1:
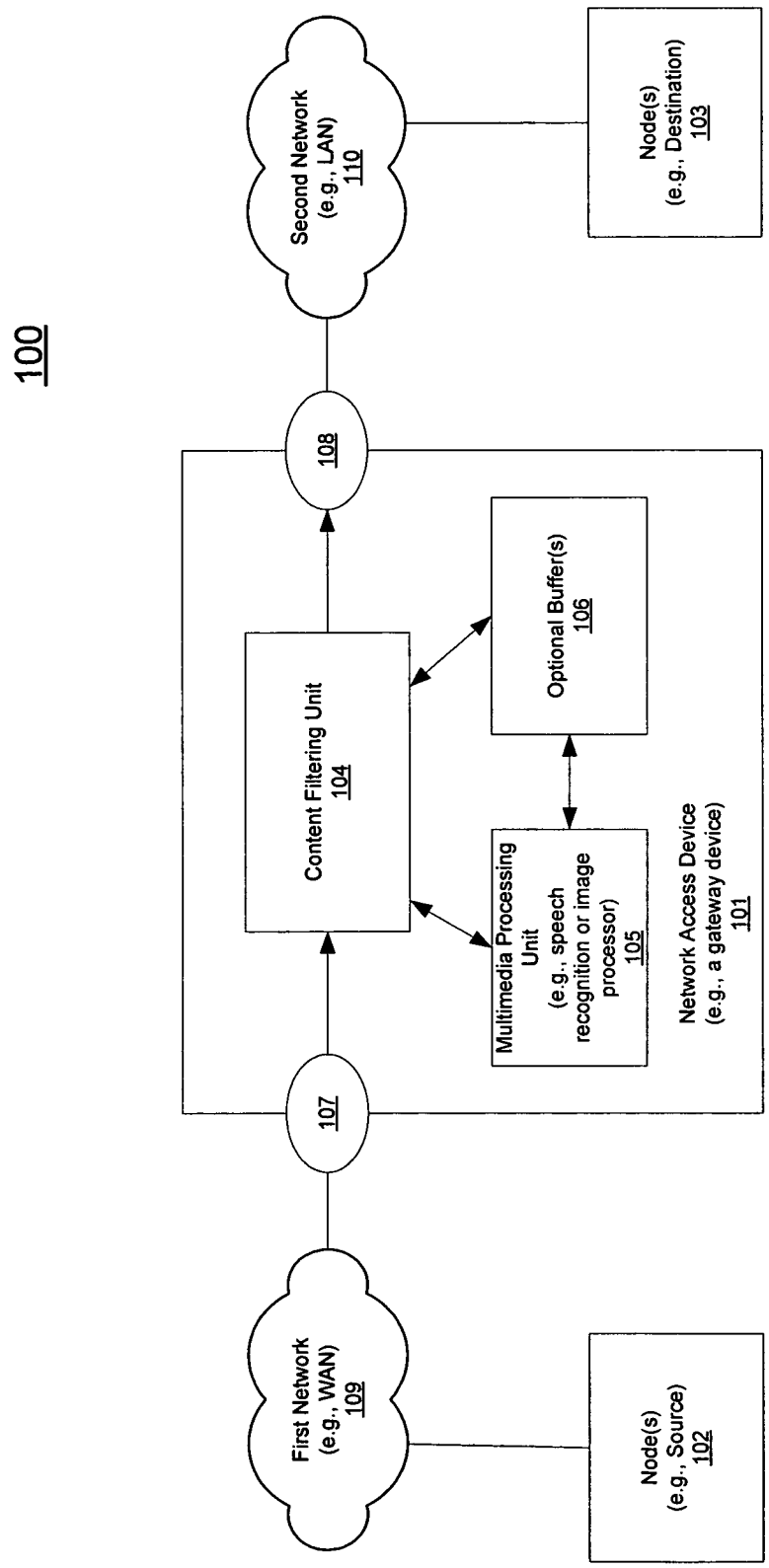
FIG. 1 is a block diagram illustrating a network configuration according to one embodiment of the invention.

FIG. 1 is a block diagram illustrating an example of network configuration according to one embodiment of the invention. Referring to FIG. 1, the network configuration 100 includes, but is not limited to, a network access device 101 (e.g., a gateway device) for interfacing a first network 109 (e.g., WAN) having node 102 (e.g., a source node) and a second network 110 (e.g., LAN) having node 103. Although one node is shown coupled to the first and second networks, multiple nodes may be coupled to each of the networks 109-110.

In one embodiment, network access device 101 includes, but is not limited to, a multimedia processing unit 105, in response to multimedia content (e.g., an audio stream) transmitted from the source 102 over a first network 109 (e.g., WAN) and destined to the destination 103 of a second network 110 (e.g., LAN), to open the multimedia content within the network access device 101. The network access device 101 further includes a content filtering unit 104 coupled to the multimedia processing unit 105 to perform content rating on the opened multimedia content to determine whether the multimedia content should be transmitted to the destination over the second network 110.

The above operations may be performed in real-time (e.g., on the fly) by the network access device 101. The above operations may be performed without letting some or all of the multimedia content to reach the destination (e.g., node 103). In one embodiment, the network access device 101 may further include an optional buffer or buffers 106 to temporarily store the multiple media content while the above operations are being performed.

In one embodiment, if the multimedia content includes an audio stream for example, a speech recognition engine may be invoked to perform recognizing a pattern or patterns of the audio stream. For example, the speech recognition unit may recognize or identify certain patterns within the audio stream. As a result, the content filtering unit 104 (e.g., content rating unit) may perform content rating on the recognized patterns. Thereafter, the content filtering unit 104 may decide whether to allow the multimedia content to be passed to the destination 103 based on the content rating on the audio stream.

In one embodiment, the audio patterns may be determined based on at least one of vocabulary and/or semantics of the recognized patterns. In another embodiment, the audio patterns may be classified based on at least one of users and/or groups associated with the destination and/or source nodes, IP subnets and/or time associated with the multimedia content.

According to one embodiment, operations performed by the network access device 101 may include, for example, at least one of anti-spyware, firewall, content filtering, intrusion detection and prevention, and/or IPSec VPNs (Virtual Private Networks), etc. functionality. Other components may be included.

In one embodiment, the connection between the network access device 101 and the network 109 may be a wired connection. Alternatively, such a connection may be a wireless connection; for example, a satellite or an IEEE 802.16 connection. The network 109 may be a wide area network (WAN), such as, for example, the Internet. The network 110 may be a home network using an IEEE 802.1x compatible protocol. Alternatively, the network 110 may be a local network within an organization (e.g., an Intranet). The network 110 may be a wired or wireless network, or a combination of both, using a variety of network protocols, such as, Ethernet and/or IEEE 802.xx compatible protocols, such as, for example, Wi-Fi and/or Bluetooth protocols. Wireless connections may include both RF and non-RF links, for example, an IR link. Wired connections may include both electrical and non-electrical links, for example, fiber optic links.

The content rating engine (not shown) may include one or more engines (e.g., one for token-based rating and one for link-based rating, etc.) The content rating engine may be implemented as a part of network access device 101. Alternatively, the content rating engine may be implemented as a dedicated server within network 110, or a Web server coupled to the network 109.

Note that the first network 109 and the second network 110 may be the same network. For example, a computer node may play a movie from a network storage residing on the same network and still enjoy multimedia content filtering services if the network traffic traverses an appliance that implements the services. Other configurations may exist.

Figure 2:
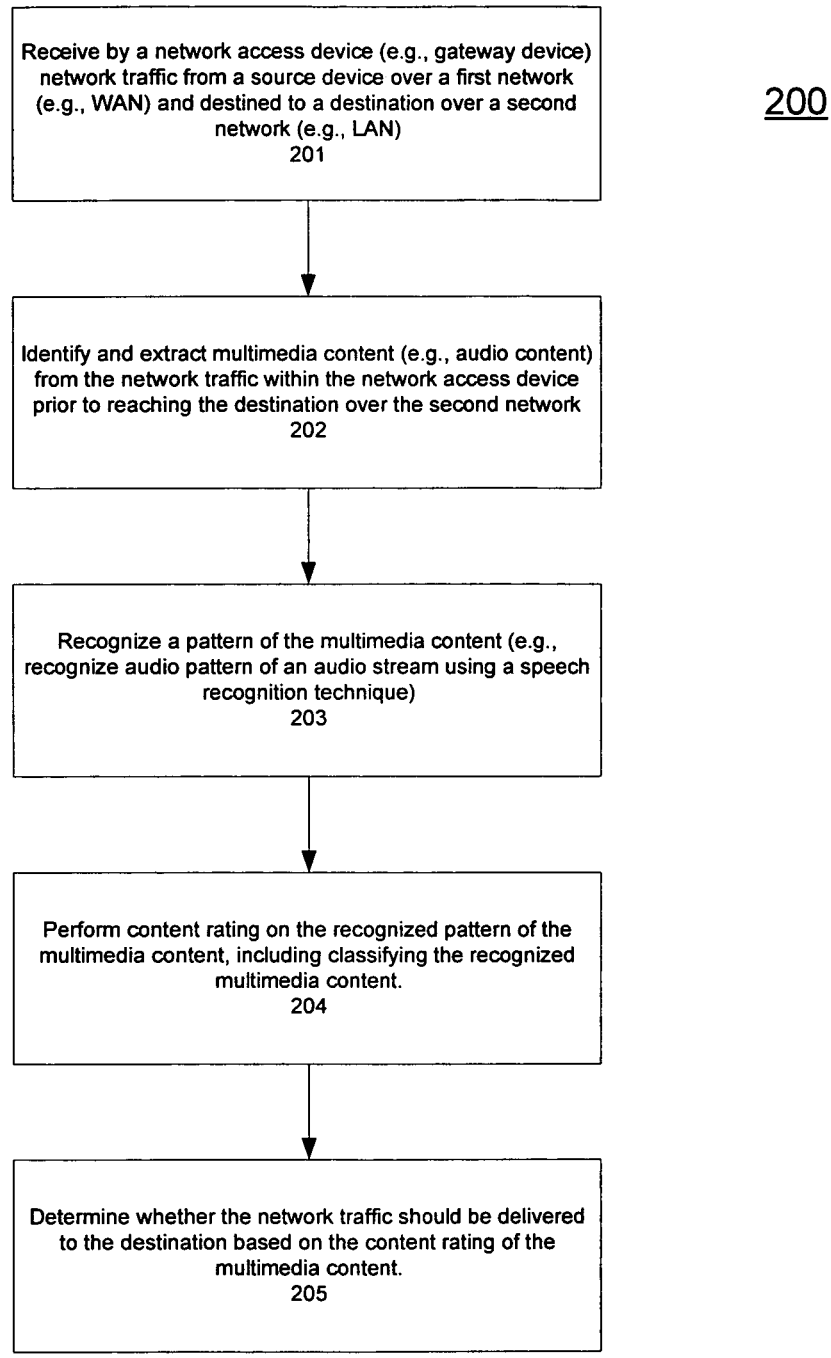
FIG. 2 is a flow diagram illustrating a process for multimedia content filtering according to one embodiment of the invention.

FIG. 2 is a flow diagram illustrating a process for multimedia content filtering according to one embodiment of the invention. The process example 200 may be performed by processing logic that may include hardware (e.g., circuitry, dedicated logic, etc.), software (such as is run on a general-purpose computer system, a server, or a dedicated machine), or a combination of both. For example, process 200 may be performed by network access device 101 of FIG. 1.

In one embodiment, process 200 includes, but is not limited to, in response to multimedia content transmitted from a source over a first network and destined to a destination over a second network, opening the multimedia content within a network access device interfacing the first and second networks, and performing content rating on the opened multimedia content to determine whether the multimedia content should be transmitted to the destination over the second network.

Referring to FIG. 2, at block 201, a network access device receives network traffic from a source device over a first network (e.g., WAN) and destined to a destination device over a second network (e.g., LAN). At block 202, the network access device identifies and extracts multimedia content from the network traffic before the multimedia content reaches the destination device over the second network. At block 203, a pattern of the multimedia content (e.g., audio stream) is recognized, for example, using a speech recognition technique. At block 204, a content rating operation is performed on the recognized multimedia content. At block 205, a determination is performed based on the content rating of the multimedia content of the network traffic to determine whether the network traffic should be delivered to the destination device. Other operations may also be performed.

Figure 3:
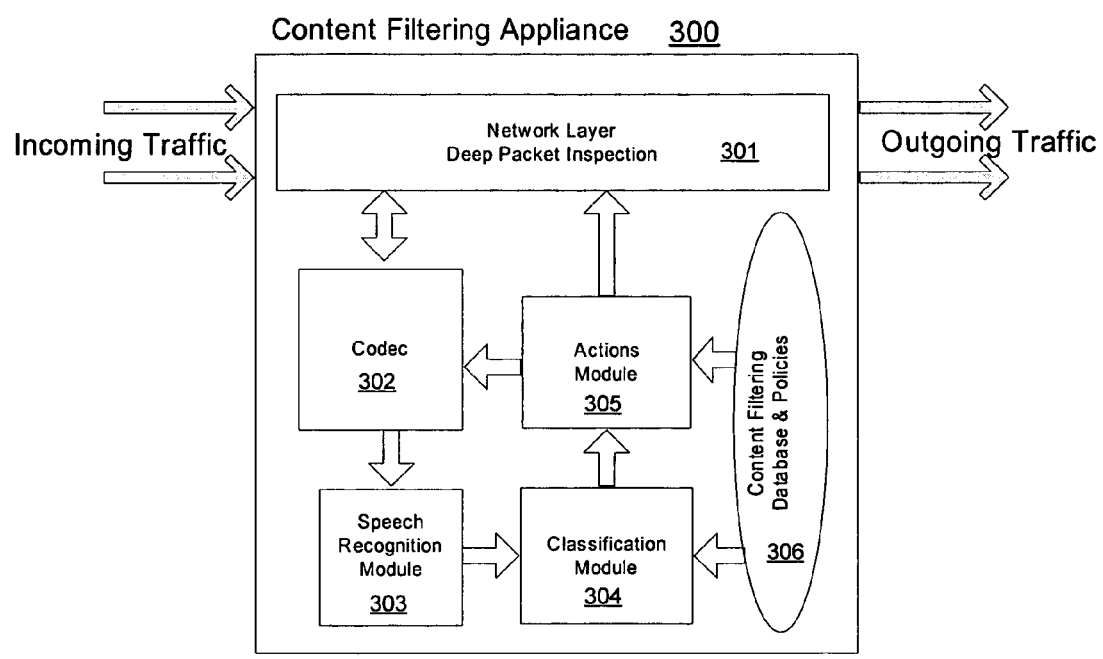
FIG. 3 is a block diagram illustrating a content filtering appliance according to one embodiment of the invention.

FIG. 3 is a block diagram illustrating an example of a content filtering appliance according to one embodiment of the invention. For example, content filtering appliance 300 may be implemented as a part of network access device 101 of FIG. 1. According to one embodiment, content filtering appliance 300 includes, but is not limited to, a packet inspection unit 301 to inspect incoming network traffic on a packet level. The packet inspection unit 301 may be implemented as a part of content filtering unit 104 of FIG. 1. In addition, content filtering appliance 300 includes an audio codec 302, speech recognition module 303, classification module 304, an action module 305, and content filtering policies 306. Again, in this embodiment, an audio content is utilized as an example of multimedia content. It is not so limited; other types of media content, such as, for example, image and/or video content may be applied.

Referring to FIG. 3, the multimedia content of incoming network traffic is detected by packet inspection unit 301. In one embodiment, such an inspection is a part of deep packet inspection implemented at a network layer. In response to the detection, an audio stream is extracted from the multimedia content and provided to audio codec 302. Codec 302 may transform the audio stream into a format suitable for speech recognition performed by speech recognition module 303, which may be built-in or implemented by a third party and accessible over a network. Patterns of the audio stream may be recognized by the speech recognition module 303.

In response to the recognized patterns of the audio stream, classification module 304 may perform content classification on the recognized audio stream based on, for example, a vocabulary or semantics of the audio stream. In response to the classification, action module 305 may take appropriate actions on the audio stream based on one or more policies 306, which may be set up by an administrator or user. For example, certain offensive words may be removed or masked out in response to the detection and/or classification.

In one embodiment, the audio codec 302 may be pluggable to facilitate support of audio streams in various formats. In addition, a flexible interface with the speech recognition module 303 allows for plugging in proprietary or third party speech recognition engine, which may be implemented locally or remotely over a network. Further, various content categories are utilized (e.g., configurable within policies 306) to allow or to block user access to various types of content. Such content categories may be tailored around specific users, groups, IP subnets, time of day or week or other relevant policies. Other configurations may exist.

Figure 4:
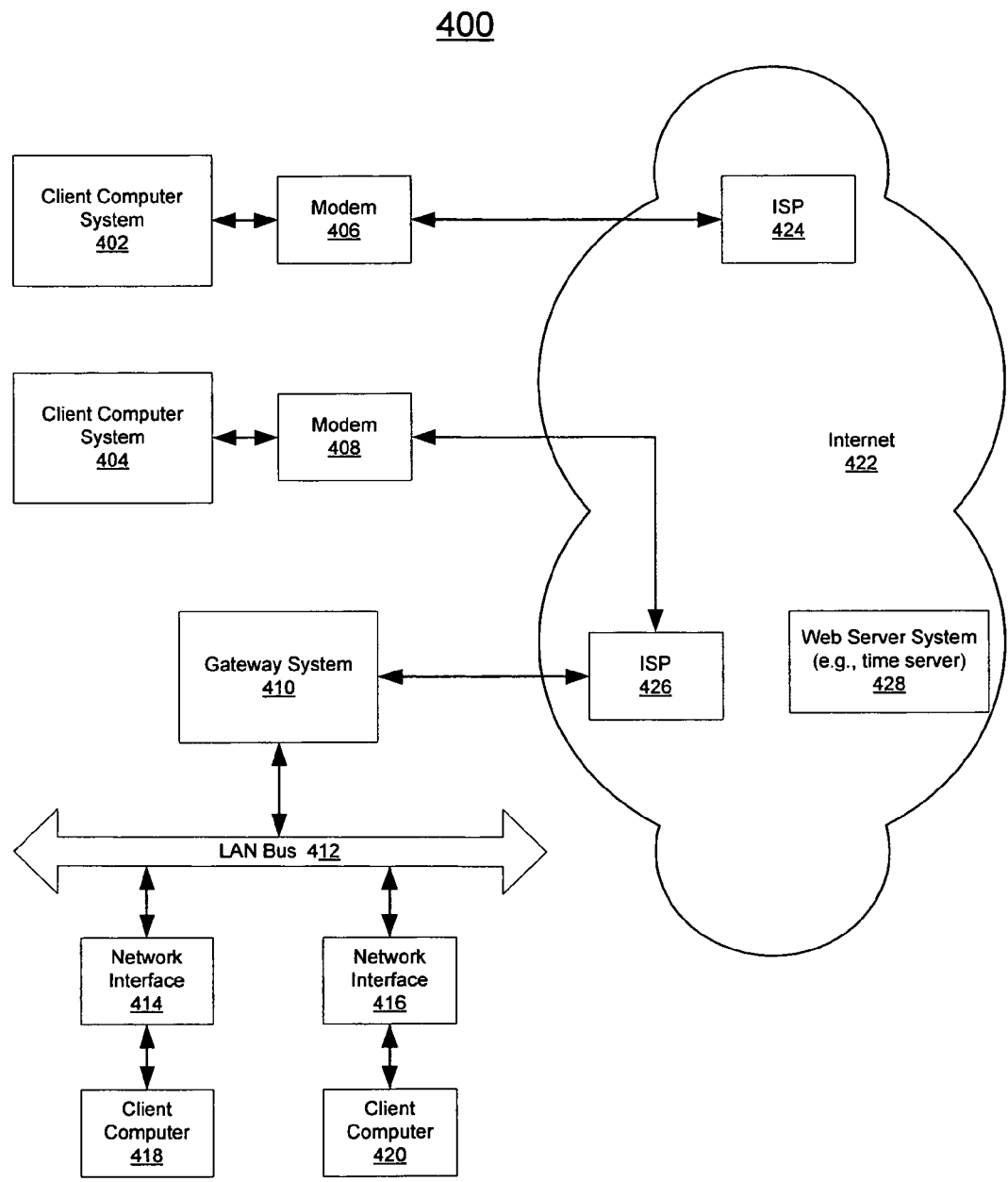
FIG. 4 is a block diagram illustrating a network configuration which may be used with one embodiment of the invention.

FIG. 4 is a diagram of a network of computer systems, which may be used with an embodiment of the invention. As shown in FIG. 4, a network 400 includes a number of client computer systems that are coupled together through an Internet 422. It will be appreciated that the term "Internet" refers to a network of networks. Such networks may use a variety of protocols for exchange of information, such as TCP/IP, ATM, SNA, SDI. The physical connections of the Internet and the protocols and communication procedures of the Internet are well known to those in the art. It will be also appreciated that such systems may be implemented in an Intranet within an organization.

Access to the Internet 422 is typically provided by Internet service providers (ISPs), such as the ISP 424, and the ISP 426. Users on client systems, such as the client computer systems 402, 404, 418, and 420, generally obtain access to the Internet through Internet service providers, such as ISPs 424 and 426. Access to the Internet may facilitate transfer of information (e.g., email, text files, media files, etc.) between two or more digital processing systems, such as the client computer systems 402, 404, 418, and 420 and/or a Web server system 428.

For example, one or more of the client computer systems 402, 404, 418, and 420 and/or the Web server 428 may provide document presentations (e.g., a Web page) to another one or more of the client computer systems 402, 404, 418, and 420 and/or Web server 428. For example, in one embodiment of the invention, one or more client computer systems 402, 404, 418, and 420 may request to access a document that may be stored at a remote location, such as the Web server 428. In the case of remote storage, the data may be transferred as a file (e.g., download) and then displayed (e.g., in a window of a browser) after transferring the file. In another embodiment, the document presentation may be stored locally at the client computer systems 402, 404, 418, and/or 420. In the case of local storage, the client system may retrieve and display the document via an application, such as a word processing application, without requiring a network connection.

The Web server 428 typically includes at least one computer system to operate with one or more data communication protocols, such as the protocols of the World Wide Web and, as such, is typically coupled to the Internet 422. Optionally, the Web server 428 may be part of an ISP which may provide access to the Internet and/or other network(s) for client computer systems. The client computer systems 402, 404, 418, and 420 may each, with appropriate Web browsing software, access data, such as HTML document (e.g., Web pages), which may be provided by the Web server 428.

The ISP 424 provides Internet connectivity to the client computer system 402 via a modem interface 406, which may be considered as part of the client computer system 402. The client computer systems 402, 404, 418, and 420 may be a conventional data processing system, such as a Power Mac G5 or iMac computer available from Apple Computer, or an IBM compatible PC, a "network" computer, a handheld/portable computer, a cell phone with data processing capabilities, a Web TV system, or other types of digital processing systems (e.g., a personal digital assistant (PDA)).

Similarly, the ISP 426 provides Internet connectivity for the client computer systems 402, 404, 418, and 420. However, as depicted in FIG. 4, such connectivity may vary between various client computer systems, such as the client computer systems 402, 404, 418, and 420. For example, as shown in FIG. 4, the client computer system 404 is coupled to the ISP 426 through a modem interface 408, while the client computer systems 418 and 420 are part of a local area network (LAN). The interfaces 406 and 408, shown as modems 406 and 408, respectively, may represent an analog modem, an ISDN modem, a DSL modem, a cable modem, a wireless interface, or other interface for coupling a digital processing system, such as a client computer system, to another digital processing system.

The client computer systems 418 and 420 are coupled to a LAN bus 412 through network interfaces 414 and 416, respectively. The network interface 414 and 416 may be an Ethernet-type, asynchronous transfer mode (ATM), or other type of network interface. The LAN bus is also coupled to a gateway digital processing system 410, which may provide firewall and other Internet-related services for a LAN. The gateway system 410, in turn, is coupled to the ISP 426 to provide Internet connectivity to the client computer systems 418 and 420. The gateway digital processing system 410 may, for example, include a conventional server computer system. Similarly, the Web server 428 may, for example, include a conventional server computer system.

In one embodiment, the local area network 412 may be local wireless network (e.g., a home network) and the gateway 410 may include a wireless access point (also referred to as a base station) to one or more clients 418 and 420 using a variety of wireless networking protocols; for example, the IEEE 802.xx protocols including Wi-Fi and/or Bluetooth protocols. In a further embodiment, the gateway 410 may access the server 428 via dialup network services using a modem.

According to one embodiment, the content filtering techniques on multimedia content described above, may be implemented with any of the network access devices, such as, modems 406 and 408, and/or gateway 410.

Figure 5:
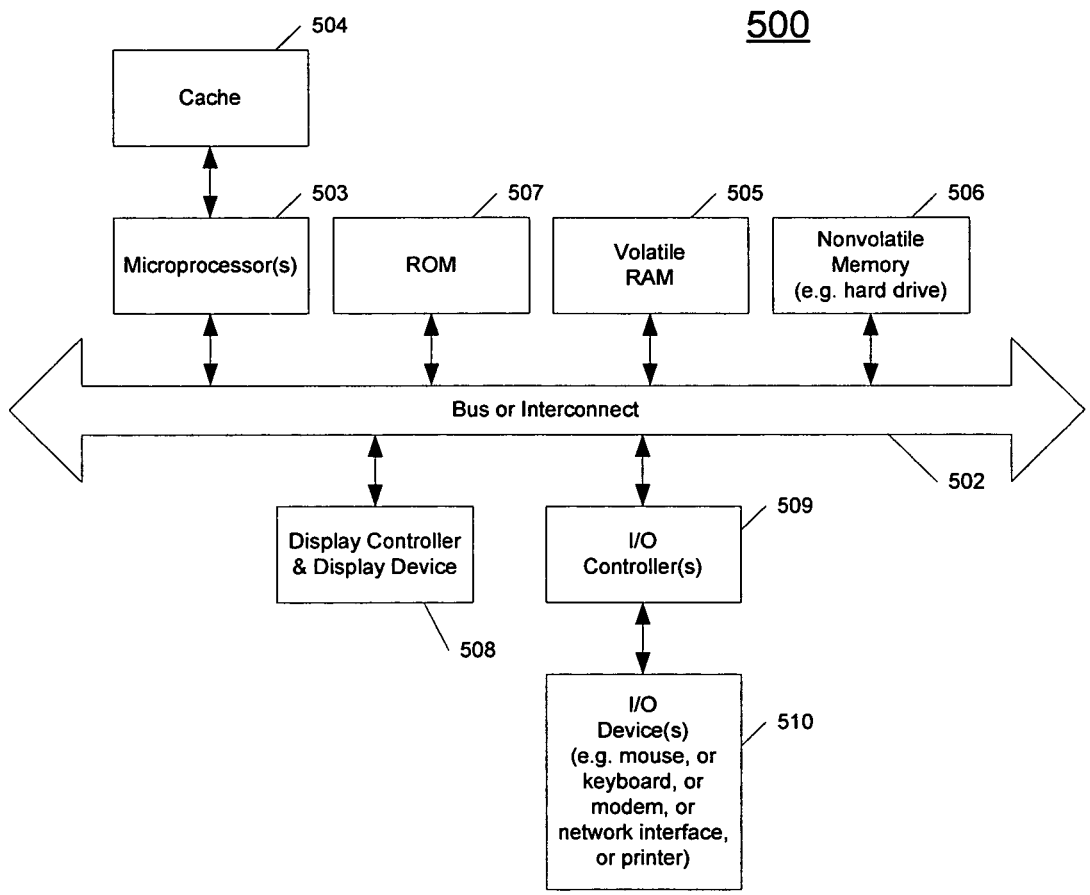
FIG. 5 is a block diagram illustrating a data processing system which may be used with one embodiment of the invention.

FIG. 5 is a block diagram of a digital processing system which may be used with one embodiment of the invention. For example, the system 500 shown in FIG. 5 may be used as a client computer system such as nodes 102-103 of FIG. 1 and/or clients 402, 404, 418, and 420 of FIG. 4. Alternatively, the exemplary system 500 may be implemented as network access devices 101 of FIGS. 1 and 300 of FIG. 3, and/or Web server 428 of FIG. 4, etc.

Note, that while FIG. 5 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 5 may, for example, be an Apple Macintosh computer or an IBM compatible PC.

As shown in FIG. 5, the computer system 500, which is a form of a data processing system, includes a bus 502 which is coupled to a microprocessor 503 and a ROM 507, a volatile RAM 505, and a non-volatile memory 506. The microprocessor 503, which may be, for example, a PowerPC G4 or PowerPC G5 microprocessor from Motorola, Inc. or IBM, is coupled to cache memory 504 as shown in the example of FIG. 5. The bus 502 interconnects these various components together and also interconnects these components 503, 507, 505, and 506 to a display controller and display device 508, as well as to input/output (I/O) devices 510, which may be mice, keyboards, modems, network interfaces, printers, and other devices which are well-known in the art.

Typically, the input/output devices 510 are coupled to the system through input/output controllers 509. The volatile RAM 505 is typically implemented as dynamic RAM (DRAM) which requires power continuously in order to refresh or maintain the data in the memory. The non-volatile memory 506 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 5 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 502 may include one or more buses connected to each other through various bridges, controllers, and/or adapters, as is well-known in the art. In one embodiment, the I/O controller 509 includes a USB (Universal Serial Bus) adapter for controlling USB peripherals. Alternatively, I/O controller 509 may include an IEEE-1394 adapter, also known as FireWire adapter, for controlling FireWire devices. Other components may also be included.

Thus, method and apparatus for multimedia content filtering are described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for multimedia content filtering, comprising:
   receiving at a network access device, multimedia content transmitted from a source over a first network and destined for a destination over a second network, the network access device communicatively coupled between the first and second networks and including a media player that plays the multimedia content; and
   executing instructions stored in memory of the network access device, wherein execution of the instructions by a processor:
      opens the multimedia content;
      plays at least a portion of the multimedia content;
      extracts audio content from the multimedia content with an audio codec of the media player;
      recognizes an audio pattern within the extracted audio content;

performs content rating on the opened multimedia content while or after playing the multimedia content, wherein performing the content rating includes classifying the opened multimedia content based on the recognized audio pattern;

determines that the entire multimedia content should not be transmitted to the destination over the second network based on the content rating; and terminates transmission of the multimedia content transmitted from the plurality of sources over the first network to the destination over the second network.

2. The method of claim 1, wherein recognizing the audio pattern of the audio content includes invoking a speech recognition process.

3. The method of claim 2, wherein classifying the opened multimedia content based on the recognized audio pattern includes classifying the recognized audio pattern based on at least one of a vocabulary and semantics of the recognized audio pattern.

4. The method of claim 3, wherein criteria of the classification of the recognized audio pattern are configured by an administrator associated with the network access device and stored in a database within the network access device.

5. The method of claim 1, further comprising identifying and removing one or more offensive words in the audio pattern before delivering the multimedia content to the destination over the second network.

6. The method of claim 1, wherein the network access device includes functionalities of one or more of anti-spyware, firewall, intrusion detection and prevention, and IPSec VPN (virtual private network).

7. The method of claim 1, further comprising:
buffering the multimedia content while the multimedia content is opened and the content filtering is performed on the multimedia content.

8. The method of claim 1, wherein the first and second networks are the same network.

9. A non-transitory machine-readable storage medium having embodied thereon executable code that when executed causes a machine to perform a method for multimedia content filtering, the method comprising:
receiving at a network access device, multimedia content transmitted from a source over a first network and destined for a destination over a second network, the network access device communicatively coupled between the first and second networks and including a media player that plays the multimedia content;
opening the multimedia content;
playing at least a portion of the multimedia content;
extracting audio content from the multimedia content with an audio codec of the media player;
recognizing an audio pattern within the audio content;
performing content rating on the opened multimedia content while or after playing the multimedia content, wherein performing the content rating includes classifying the opened multimedia content based on the recognized audio pattern;
determining that the entire multimedia content should not be transmitted to the destination over the second network based on the content rating; and
terminating transmission of the multimedia content transmitted from the source over the first network to the destination over the second network.

10. The non-transitory machine-readable storage medium of claim 9, wherein recognizing the audio pattern of the audio content includes invoking a speech recognition process.

11. The non-transitory machine-readable storage medium of claim 10, wherein classifying the opened multimedia content based on the recognized audio pattern includes classifying the recognized audio pattern based on at least one of a vocabulary and semantics of the recognized audio pattern.

12. The non-transitory machine-readable storage medium of claim 11, wherein criteria of the classification of the recognized audio pattern are configured by an administrator associated with the network access device and stored in a database within the network access device.

13. The non-transitory machine-readable storage medium of claim 9, wherein the method further comprises identifying and removing one or more offensive words in the audio pattern before delivering the multimedia content to the destination over the second network.

14. The non-transitory machine-readable storage medium of claim 9, wherein the network access device includes functionalities of one or more anti-spyware, firewall, intrusion detection and prevention, and IPSec VPN (virtual private network).

15. The non-transitory machine-readable storage medium of claim 9, wherein the method further comprises buffering the multimedia content while the multimedia content is opened and the content filtering is performed on the multimedia content.

16. An apparatus, comprising:
a network access device that receives multimedia content transmitted from a source over a first network and destined for a destination over a second network, wherein the network access device is communicatively coupled between the first network and the second network and comprises:
a multimedia processing unit that the multimedia content, wherein the multimedia processing unit includes a media player that plays the multimedia content at least a portion of the multimedia content;
an audio codec that extracts audio content from the opened multimedia content, the audio codec coupled to the multimedia processing unit;
a speech recognition engine that recognizes an audio pattern within the extracted audio content, the speech recognition engine coupled to the multimedia processing unit;
a content filtering unit that performs content rating on the opened multimedia content while or after playing the multimedia content, wherein performing the content rating includes classifying the opened multimedia content based the recognized audio pattern, determining that the entire multimedia content should not be transmitted to the destination over the second network based on the content rating, and terminating transmission of the multimedia content transmitted from the source over the first network to the destination over the second network.

17. The apparatus of claim 16, wherein the content filtering unit classifies the recognized audio pattern based on at least one of a vocabulary and semantics of the recognized audio pattern.

18. The apparatus of claim 16, wherein the content filtering unit includes a classification unit that classifies the recognized audio pattern based on a set of predetermined criteria configured by an administrator and stored in a content filtering policy database.

19. The apparatus of claim 18, wherein the network access device further includes an action unit that removes one or more offensive words from the audio pattern recognized by the speech recognition unit and classified by the classification unit before delivering the multimedia content to the destination over the second network.

20. The apparatus of claim 16, wherein the network access device includes functionalities of one or more anti-spyware, firewall, intrusion detection and prevention, and IPSec VPN (virtual private network).

21. The apparatus of claim 19, wherein the network access device further includes a buffer that buffers the multimedia content while the multimedia content is open and the content filtering unit performs content filtering on the multimedia content.

\* \* \* \* \*